United States Patent [19]

Murray

[11] 4,205,735
[45] Jun. 3, 1980

[54] MEANS FOR PREVENTING ONE WHEEL SPIN OUT OF AUTOMOTIVE DRIVE WHEELS

[75] Inventor: Charles F. Murray, Southfield, Mich.

[73] Assignee: Howard G. Liverance, Southgate, Mich. ; a part interest

[21] Appl. No.: 943,054

[22] Filed: Sep. 18, 1978

[51] Int. Cl.² .............................................. B60T 8/00
[52] U.S. Cl. ........................................ 188/16; 188/85
[58] Field of Search .......................... 188/16, 85, 354; 180/6.24, 82 D; 192/49, 50, 48.9

[56] References Cited

U.S. PATENT DOCUMENTS

| 2,591,171 | 4/1952 | Lohse | 188/16 X |
| 2,815,098 | 12/1957 | Olving | 188/85 |
| 3,361,487 | 1/1968 | Uriend | 188/85 X |
| 3,899,048 | 8/1975 | Huvers | 188/16 |
| 4,054,187 | 10/1977 | Sbarro | 188/16 |

FOREIGN PATENT DOCUMENTS 711,269  9/1941  Fed. Rep. of Germany ............. 188/16

Primary Examiner—George E. Halvosa
Attorney, Agent, or Firm—Robert G. Mentag

[57] ABSTRACT

A method and apparatus for alternately braking a pair of drive wheels on an automotive vehicle to increase the total tractive effort of the vehicle, by preventing the spinning of a drive wheel which is on ice, in mud, on a slippery spot, and the like. An electric motor is mounted on the vehicle frame in a position near the two parking or emergency brake conventional operating cables. An elongated drive structure interconnects the motor and the brake operating cables to alternately exert tension on one of the cables while releasing tension on the other, and continuing the alternate tensioning of the cables to brake one drive wheel while the other drive wheel remains free to gain traction.

7 Claims, 6 Drawing Figures

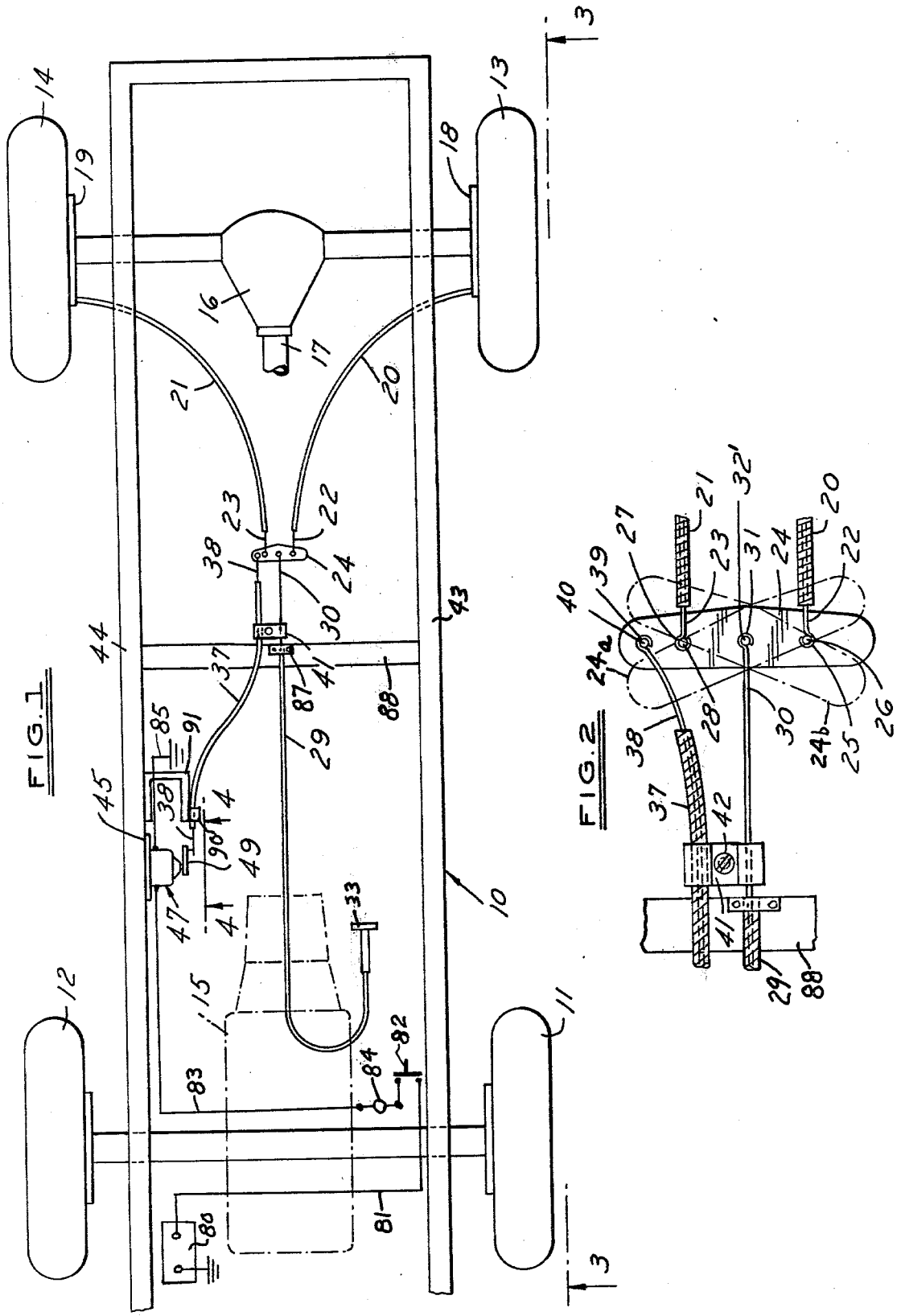

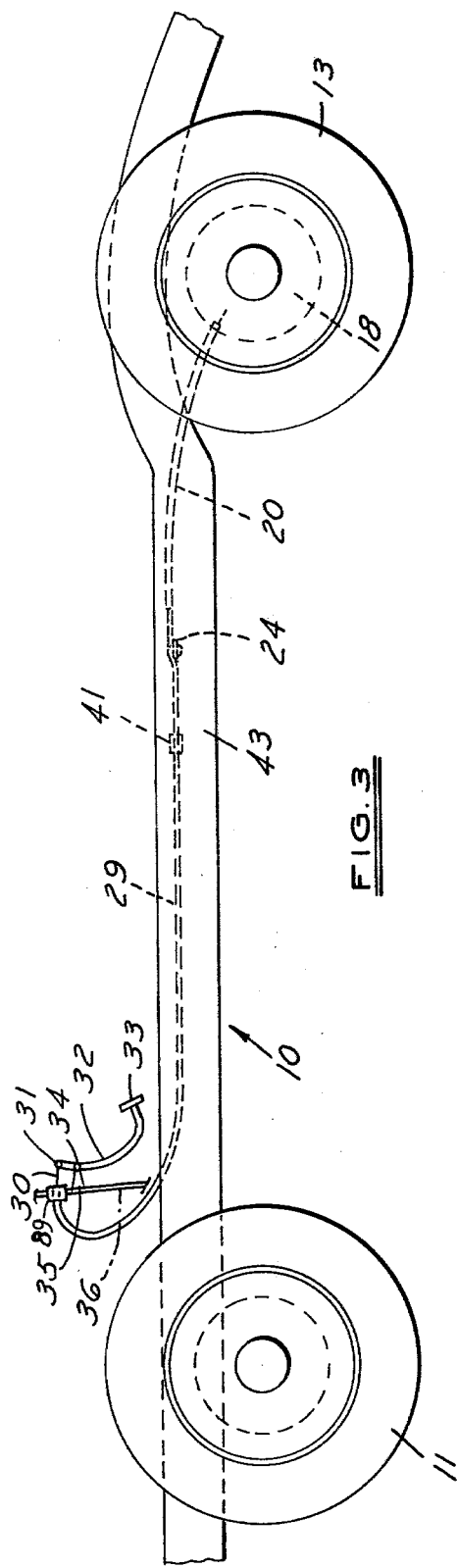
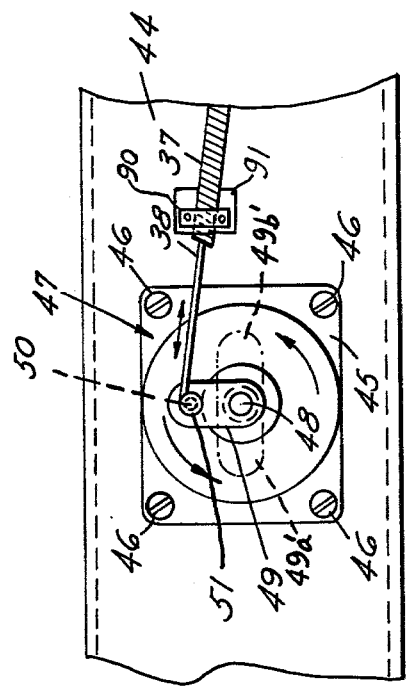

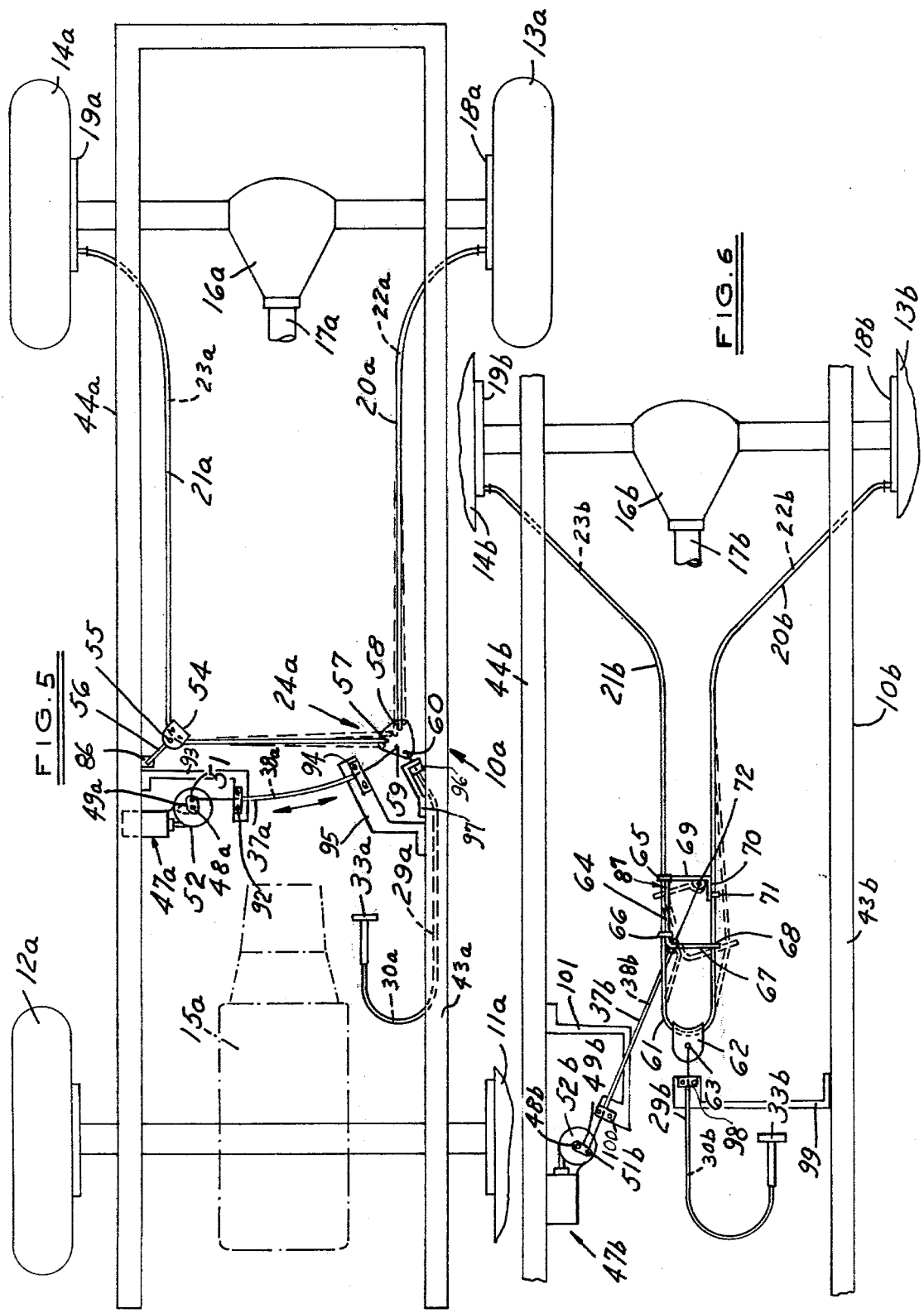

MEANS FOR PREVENTING ONE WHEEL SPIN OUT OF AUTOMOTIVE DRIVE WHEELS

BACKGROUND OF THE INVENTION

1. Field of the Invention

This invention relates generally to improvements in brakes for vehicles, and more particularly, to a braking means for preventing one wheel spin-out of automotive drive wheels. The invention is particularly concerned with an apparatus for alternately braking the drive wheels of an automotive vehicle by providing controlled separate braking on each of said wheels. The apparatus of the present invention is useful when an automotive vehicle having the usual two drive wheels is provided with the conventional type differential and is in a situation where one wheel slips and the other is on firm ground. The apparatus of the present invention in such situation is operative to apply the brakes on the usual two drive wheels in an alternate fashion, to permit the drive wheels to drive alternately, and thus move the vehicle out of a stuck position in mud, snow or the like.

2. Description of the Prior Art

It is well known in the automotive vehicle art to provide positive traction of both drive wheels by the use of limited slip differentials. However, such limited slip differentials must be built into the vehicle when it is manufactured in order to provide such a differential at minimum cost. It is not possible to install a limited slip differential on an automobile after it has been purchased without paying an exorbitant price. Also, limited slip differentials are not available on many vehicle models as original equipment or as after-market equipment.

Heretofore, other types of devices were built into a vehicle when it was manufactured, which would assist in applying a braking action to one rear drive wheel at a time, to facilitate the vehicle in pulling itself out of a slippery or skidding spot. One example of a device of this type is a special emergency brake shown in U.S. Pat. No. 2,433,581. The braking device shown in this patent is hand operated and is operated through the usual emergency brake lever. The brake handle for operating this device is located in a vehicle under the dashboard. Prior U.S. Pat. Nos. 1,635,727 and 1,736,082 each disclose mechanical means for alternately braking the rear wheels of a vehicle by means of hand operated levers mounted on the frame of the vehicle. Prior U.S. Pat. 1,584,358 and 2,821,265 disclose tow mechanically operated apparatuses for alternately braking the rear wheels of a vehicle, and wherein the apparatus is operated by foot pedals. U.S. Pat. No. 3,398,813 shows a similar mechanical device which is operated by hand knobs mounted on the dashboard of a vehicle. Prior U.S. Pat. Nos. 2,346,175, 2,351,098 and 3,466,096 each show hydraulic braking means for selective braking of the rear wheels of a vehicle.

None of the aforementioned prior art patents show a braking system for alternately braking the two drive wheels of an automotive vehicle by employing the regular emergency brake system, together with an easily attached oscillator means.

SUMMARY OF THE INVENTION

In accordance with the present invention, the parking or emergency brake on the usual two drive wheels of an automotive vehicle may be operated or applied in an alternate fashion, to permit the drive wheels to drive alternately and thus move the vehicle out of a position whereby it may be stuck in mud, snow or the like, or have one wheel on a slippery spot. Conventional automotive vehicles are normally provided with a pair of parking brakes or emergency brakes on the two drive wheels, and each of said brakes is operated by a separate cable which has one end attached to a common yoke member. The last mentioned yoke member is connected by another brake operating cable to a brake operating member, such as a hand lever or an emergency or parking brake operating pedal. When the brake operating member is actuated, the yoke member is moved in a direction away from the brakes so as to simultaneously operate both brakes. The apparatus of the present invention functions to apply a lateral force alternately on the two brake cables connected to the brakes, so as to alternately brake one drive wheel while the other drive wheel remains free to gain traction.

BRIEF DESCRIPTION OF THE DRAWINGS

FIG. 1 is a top plan view of an apparatus made in accordance with the principles of the present invention for preventing one wheel spin-out of automotive drive wheels.

FIG. 2 is a fragmentary, enlarged plan view of the operating yoke structure of the apparatus shown in FIG. 1.

FIG. 3 is a front elevation view of the structure illustrated in FIG. 1, taken along the line 3—3 thereof, and looking in the direction of the arrows.

FIG. 4 is a fragmentary, enlarged, elevation view of the structure illustrated in FIG. 1, taken along the line 4—4 thereof, and looking in the direction of the arrows.

FIG. 5 is a top plan view of a second embodiment of the invention.

FIG. 6 is a top plan view of a third embodiment of the invention.

DESCRIPTION OF THE PREFERRED EMBODIMENTS

Referring now to the drawings, and in particular to FIG. 1, the numeral 10 generally designates a schematic view of the frame of a conventional rear drive automotive vehicle. The numerals 11 and 12 designate the conventional front wheels of the vehicle, and the numerals 13 and 14 designate the conventional two rear drive wheels of the vehicle. The numeral 15 designates the usual engine for propelling the vehicle. The numeral 16 generally designates a conventional type differential which is operatively connected to the rear axle of the vehicle for driving the rear wheels 13 and 14. The numeral 17 designates the usual drive shaft which operatively interconnects the engine 15 with the differential 16. The numerals 18 and 19 designate the conventional emergency brakes which are operatively mounted on the wheels 13 and 14, respectively, and which are operated by the usual brake operating cables 22 and 23.

As shown in FIGS. 1 and 2, the brake operating cables 22 and 23 are operatively mounted in protective sheaths or casings 20 and 21, respectively. The rear ends of the cables 22 and 23 are operatively connected in the usual way to the brakes 18 and 19, and the front ends are looped, as indicated by the numerals 25 and 27, respectively. The cable looped front ends 25 and 27 are operatively mounted by means of suitable pivot pins 26 and 28 to a transverse, elongated yoke member 24. The yoke member 24 is a conventional device for joining the front ends 25 and 27 of the brake operating cables 22 and 23 together, so that they may be moved forwardly and backwardly simultaneously for operating the emergency brakes 18 and 19. The yoke member 24 is normally moved forwardly and backwardly by an operating cable 30, which is mounted in a protective sheath 29. The rear end of the sheath 29 is anchored or grounded by a suitable clamp 87 to a fixed vehicle cross frame member 88. The front end of the cable 30 is operatively connected to a conventional brake pedal 33 to permit the driver of the vehicle to press on the cable 30 and to pull the yoke member 24 forwardly, and thereby move the cables 22 and 23 forwardly for operating the brakes 18 and 19. The rear end of the brake cable 30 is looped, as shown by the numeral 31, (FIG. 2), and it is operatively mounted around an anchor pin 32' that is carried in a central position on the yoke member 24.

As shown in FIG. 3, the front end of the cable 30 is also provided with a looped end 31 which is conventionally attached by a suitable pivot pin to the upper end of a conventional lever 32. The lever 32 carries the conventional foot brake pedal 33 for applying the emergency brakes 18 and 19. The lever 32 is pivoted at the pivot point 34 on the mounting bracket 35 which is carried on the usual front wall 36 of the passenger compartment of the vehicle. The front end of the sheath 29 is anchored or grounded by a suitable clamp 89 to said front wall 36.

In accordance with the present invention, a fourth brake operating cable 38 is provided with a rear looped end 39 (FIG. 2) which is attached by a suitable pivot pin 40 to the outer part of one of the ends of the elongated yoke member 24. The wire cable 38 is slidably mounted through a suitable protective sheath or tubing 37. The rear end of the tubing 37 is fixedly secured to a clamp 41 by a screw 42, and in a position spaced apart from the usual emergency brake operating cable 30. The clamp 41 is also fixed to the cable 30. As shown in FIG. 4, the front end of the wire 38 is adapted to be moved forwardly and backwardly in a selective manner by a suitable electric drive motor, generally indicated by the numeral 47. The longitudinal frame portions of the illustrative vehicle are indicated by the numerals 43 and 44. As shown in FIGS. 1 and 4, the electric drive motor 47 is operatively attached to the inside vertical surface of the vehicle right frame member 44. The front end of the sheath 37 is grounded or fixed in place by a suitable clamp 90 that is suitably secured to a bracket 91. The bracket 91 is fixed to the vehicle frame member 44 by any suitable means. As shown in detail in FIG. 4, the electric drive motor 47 is carried on a mounting plate 45 which is secured by suitable screws 46 to the frame 44. The electric drive motor 47 includes a built-in gear reduction means which has an output shaft 48 on which is operatively mounted one end of a drive arm 49. The front end of the drive cable 38 is looped, and it is operatively mounted around a suitable attachment screw 51 which is threadably mounted in a suitable threaded bore 50 formed in the outer end of the drive arm 49, in a position spaced apart from the motor output shaft 48. The electric drive motor 47 may be any suitable motor, as for example, a 12-volt electric D.C. motor which may be driven by the vehicle battery 80. An illustrative circuit for connecting the motor 47 to the battery 80 of the vehicle 10 is illustrated in FIG. 1. The battery 80 is the usual 12-volt battery for vehicles, and the negative terminal is connected to ground, the vehicle body, while the positive terminal of the battery is connected by a lead wire 81 to one terminal of a manually operated switch 82. The other terminal of the switch 82 is connected by a lead wire 83 to one terminal of the motor 47. A suitable indicator light 84 may be included in the lead wire 83 circuit to indicate when the switch 82 is closed manually, and the motor 47 is operating. The other terminal of the motor 47 is connected by a suitable lead wire 85 to ground. The switch 82 may be interconnected with the usual ignition switch so as to make the switch 82 inoperative if the ignition switch is off.

In operating the apparatus of the present invention, the driver of the vehicle applies the emergency brake by applying pressure on the pedal 33 and moving it approximately a third of the way inwardly. The operator then depresses the switch 82 which is normally mounted on the dashboard of the vehicle, so as to energize the motor 47. The arm 49 is then rotated in a circular, counter-clockwise manner and passes through the two dotted line positions shown by the numerals 49a' and 49b' in FIG. 4. When the lever arm is in the position 49a', the brake cable 38 moves and pivots the yoke 24 to the dotted line position indicated by the numeral 24a in FIG. 2, which exerts a pull on the brake cable 23 and operates the brake 19 to brake the wheel 14 and release the braking action on wheel 13. When the lever arm 49 reaches the dotted line position 49b', shown in FIG. 4, the yoke 24 is pivoted in the opposite direction to the dotted line position 24b so as to exert a forward pull on the brake cable 22 to operate the brake 18 and brake the wheel 13 and release the braking action on the wheel 14.

It will be seen from the foregoing description of the operation of the apparatus of the present invention, that is provides alternate braking action to the back wheels or drive wheels of a conventional automotive vehicle by using the standard emergency brake cables. The apparatus of the present invention is useful and advantageous on a vehicle provided with a conventional type differential when the vehicle is stuck in a road situation wherein one wheel slips and the other is on firm ground. As for example, where one wheel may be on dry ground and the other may be stuck in mud or snow. By alternately braking the drive wheels, it is possible to move the vehicle out of the stuck position.

It will also be seen that the apparatus of the present invention can be mounted on vehicles after they are manufactured. The last mentioned assembly feature is advantageous, because a conventional limited slip differential of the type mounted in a vehicle during assembly at the factory is expensive. On the other hand, a person who could afford the cost of a conventional limited slip differential may not think to order the same when ordering the vehicle, and it is also expensive to disassemble the rear drive structure of a built vehicle and incorporate such a differential. Accordingly, the apparatus of the present invention can provide the last mentioned persons with the same benefits of a limited slip differential, but at less cost because it may be installed quickly and easily on a vehicle already manufactured.

FIG. 5 illustrates a second embodiment of the invention. The parts of the structure illustrated in FIG. 5 which are the same as the parts of the structure illustrated in FIGS. 1 through 4, have been marked with the same reference numerals followed by the letter "a". The only difference between the structure of the second embodiment of FIG. 5 and the first embodiment of FIGS. 1 through 4 is that the brake cable arrangement and the yoke for actuating the same is arranged in a slightly different manner.

As shown in FIG. 5, the drive motor 47a is provided with a separate gear reduction unit 52 which has an output shaft 48a that carries a drive arm 49a. The cable 38a has one end attached to the outer end of the lever arm 49a, at the point indicated by numeral 51 and in the same manner as described hereinbefore in the embodiment of FIGS. 1 through 4. The other end of the cable 38a is attached to the yoke member 24a at the point indicated by the numeral 59, and in the same manner as described hereinbefore in the embodiment of FIGS. 1 through 4 for attaching the cable 38 to the yoke member 24. The yoke member 24a is disposed towards the driver's side of the vehicle, as compared to the central position of the yoke member 24 of the first embodiment. The left drive wheel brake cable 22a has its front end attached to the yoke member 24a at the point 58. The right drive wheel brake cable 23a has its front end attached to the yoke 24a at the point indicated by the numeral 57. The connections of the last mentioned brake cables 22a and 23a to the yoke member 24a are carried out in the same manner as shown in FIG. 2 for the first embodiment.

As shown in FIG. 5, the brake cable 23a for the right drive wheel brake 19a extends forwardly and is slidably mounted through a bracket 54 from whence it extends transversely across the vehicle to its connection point 57 on the yoke member 24a. The bracket 54 is secured at the point 55 to one end of a support rod 56 which has its other end operatively attached to a mounting bracket 86. The bracket 86 is secured by any suitable means, as by welding, to the longitudinally extended frame rail 44a.

The brake operating cable 30a has its rear end attached to the yoke member 24a at the point 60 in the same manner as the cable 30 is shown attached in FIG. 2 to the yoke 24 for the first embodiment. The front end of the sheath 37a, which encloses the cable 38a, is secured by a suitable clamp 92 to the inner end of a bracket 93. The front end of the bracket 93 is fixed in position by any suitable means, as by welding, to the inner side of the vehicle longitudinal frame member 44a. The rear end of the sheath 37a is fixed or anchored in position by a suitable clamp 94 which is secured to the inner end of a bracket 95. The outer end of the bracket 95 is fixed by any suitable means to the inner side of the vehicle longitudinal frame member 43a. The front end of the sheath 29a for the brake operating cable 30a would be secured in the same manner as the front end of the sheath 29 is secured for the first embodiment, as shown in FIG. 3. The rear end of the sheath 29a is fixed or anchored in position by a suitable clamp 96 which is secured to the inner end of a bracket 97. The bracket 97 is secured by any suitable means, as by welding, to the inner side of the vehicle longitudinal frame member 43a.

In use, the 12-volt motor 47a would be operatively connected to the vehicle battery in the same manner as shown for the first embodiment of FIG. 1. An operating switch would also be provided for the embodiment of FIG. 5 in the same manner as for the embodiment of FIG. 1. It will be seen that when the motor 47a is actuated, that the cable 38a will be moved back and forth longitudinally, by the operation of the rotating lever 49a, so as to oscillate the yoke member 24a and move the brake cables 22a and 23a between the broken line positions shown in FIG. 5 to operate the emergency brakes 18a and 19a in the same manner as described hereinbefore for the first embodiment of FIG. 1. It will be understood that the brake pedal 33a will be depressed approximately a third of the distance for full application of the brakes 18a and 19a, preliminary to operating the motor 47a, as described hereinafter for the operation of the embodiment of FIG. 1.

FIG. 6 illustrates a third embodiment of the invention. The parts of the structure illustrated in FIG. 6 which are the same as the parts of the structure illustrated in FIGS. 1-4 and 5 of the first and second embodiments, have been marked with the same reference numerals followed by the letter "b". The only difference between the structure of the third embodiment of FIG. 6, and the first embodiment of FIGS. 1 through 4, is that the brake cable arrangement and the yoke member for actuating the same is arranged in a slightly different manner, and a swivel bar is employed for driving the brake actuating cables in opposite directions for alternate braking.

As shown in FIG. 6, the drive motor 47b is provided with a separate gear reduction unit 52b which has an output shaft 48b that carries a drive arm 49b. The drive cable 38b has one end attached to the outer end of the cable lever arm 49b at the point indicated by the numeral 51b, and in the same manner as described hereinbefore for the embodiment of FIGS. 1-4. The other end of the drive cable 38b is attached to a swivel bar, generally-indicated by the numeral 87, as more fully described hereinafter.

As shown in FIG. 6, the drive wheel brake operating cables 22b and 23b are integrally connected at their front ends by a U-shaped connection portion indicated by the numeral 61 which is looped around the arcuate rear end of a yoke member 62. The yoke member 62 is centrally disposed between the vehicle frame rails 44b and 43b, and it is connected at the point 63 to the rear end of the usual brake operating cable 30b. The rear end of the sheath 29b which covers the brake operating cable 30b is fixed or anchored in place by a suitable clamp 98 to the inner end of a bracket 99. The outer end of the bracket 99 is fixed by any suitable means, as by welding, to the inner side of the vehicle longitudinal frame member 10b. The front end of the sheath 29b for the brake operating cable 39b would be secured in the same manner as the front end of the sheath 29 is secured for the first embodiment, as shown in FIG. 3.

As shown in FIG. 6, the swivel bar 87 includes a longitudinally disposed rod 64 which is positioned along the inner side of the right brake operating cable 23b. The front end of the rod 64 is fixedly attached to the cable 23b by a suitable cable clamp 66. A transverse rod 67 has one end integrally attached to the front end of the longitudinal rod 64, and the other end is provided with an integral loop 68 which extends around the other brake operating cable 22b to allow relative sliding movement of the loop 68 along the cable 22b. The rear end of the longitudinal rod 64 is also fixed, as by welding, to the right end of a transverse rod 69. The left end of the transverse rod 69 is integrally attached to a longitudinally extended rod 70 which is fixedly secured by any suitable means, as by a cable clamp 71, to the brake operating cable 22b. The rear end of the brake operating cable 38b is fixedly attached at the point 72 to a loop member which is integrally attached to the transverse rod 69. The rear end of the sheath 37b for the operating cable 38b is attached by any suitable means to the right side of the transverse bar 67. For example, the sheath 37b may extend through a suitable loop attached to the bar 67, and then have the ends thereof extended crimped outwardly to form a clamp on either side of the loop on the bar 67 to hold the sheath 37b fixed to the bar 67. The front end of the sheath 37b is fixedly secured in place by a suitable clamp 100 which is fixed to the inner end of a suitable bracket 101. The outer end of the bracket 101 is fixed by any suitable means, as by welding, to the inner side of the vehicle longitudinal frame member 44b.

In use, the 12-volt battery 47b would be operatively connected to the vehicle battery in the same manner as shown for the first embodiment of FIG. 1. An operating switch would also be provided for the embodiment of FIG. 6 in the same manner as for the embodiment of FIG. 1.

It will be seen that when the motor 47b is actuated, that the operating cable 38b will be moved forwardly and backwardly by the operation of the rotating lever 49b, so as to oscillate the swivel bar structure 87, and alternately move the brake cables 22b and 23b sidewardly, as shown by the broken lines in FIG. 6, to operate the emergency brakes 18a and 19a in the same manner as described hereinbefore for the first embodiment.

The broken lines in FIG. 6 show the cables 22b and 23b moved sidewardly so as to tighten the cable 23b to apply the brake 19b and to release the braking action on the brake 18b. When the operating arm 49b is moved clockwise to a position diametrically opposite to the solid line position shown in FIG. 6, the opposite movement of the cables 22b and 23b will be effected to reverse the operations of the brakes 18b and 19b. It will be understood that the brake pedal 33b will be depressed approximately a third of the distance for full application of the brakes 18b and 19b preliminary to operating the motor 47b, as described hereinbefore for the operation of the embodiment of FIG. 1.

While it will be apparent that the preferred embodiments of the invention herein disclosed are well calculated to achieve the results aforestated, it will be appreciated that the invention is susceptible to modification, variation and change.

What is claimed is:

1. A method of alternately braking a pair of drive wheels on an automotive vehicle wherein each of the drive wheels is provided with a separate emergency brake, and a first operating cable has one end operatively attached to one of the emergency brakes and the other end operatively attached to a, cable tension equalizer means and a second brake operating cable has one end operatively attached to the other of the emergency brakes and the other end operatively attached to said cable tension equalizer means, and a third brake operating cable has one end attached to said cable tension equalizer means and the other end attached to a brake operating member for normally moving said cable tension equalizer means in a direction to exert a brake operating tension simultaneously on both of said first and second brake operating cables, said method comprising the steps of power oscillating said cable tension equalizer means through a unidirectionally rotating arm in one direction and then in the opposite direction to alternately exert a tension on said first brake operating cable and release tension on said second brake operating cable, and then exert a tension on said second brake operating cable and release tension on said first brake operating cable, and continuing the power oscillation of said alternate tensioning of said first and second brake operating cables to alternately brake one drive wheel while the other drive wheel is released to provide traction.

2. A method of alternately braking a pair of drive wheels on an automotive vehicle wherein each of the drive wheels is provided with a separate emergency brake, and a first brake operating cable has one end operatively attached to one of the emergency brakes and the other end operatively attached to a cable tension equalizer means, and a second brake operating cable has one end operatively attached to the other of the emergency brakes and the other end operatively attached to said cable tension equalizer means, and a third brake operating cable has one end attached to said cable tension equalizer means and the other end attached to a brake operating member for normally moving said cable tension equalizer means in a direction to exert a brake operating tension simultaneously on both of said first and second brake operating cables, said method comprising the steps of, applying a powered lateral force through a unidirectionally rotating arm alternately on said first and second brake cables in one direction and then in the opposite direction to alternately exert a tension on said first brake operating cable and release tension on said second brake operating cable, and then exert a tension on said second brake operating cable and release tension on said first brake operating cable, and continuing the application of said powered lateral force to provide said alternate tensioning of said first and second brake operating cables to alternately brake one drive wheel while the other drive wheel is released to provide traction.

3. In a means for alternately braking a pair of drive wheels on an automotive vehicle wherein each of the drive wheels is provided with a separate emergency brake, and a first brake operating cable has one end operatively attached to one of the emergency brakes and the other end operatively attached to a cable tension equalizer means, and a second brake operating cable has one end operatively attached to the other of the emergency brakes and the other end operatively attached to said cable tension equalizer means, and a third brake operating cable has one end attached to said cable tension equalizer means and the other end attached to a brake operating member for normally moving said cable tension equalizer means in a direction to exert a brake operating tension simultaneously on both of said first and second brake operating cables, the combination comprising:

(a) drive motor means mounted on said vehicle near said first and second brake cables;

(b) control means inside the passenger compartment and accessible to the drive for controlling the operation of said drive motor means; and, (c) unidirectionally rotating drive means interconnected with said drive motor means and said first and second brake operating cables to alternately exert a tension on said first brake operating cable and release tension on said second brake operating cable, and then exert a tension on said second brake operating cable and release tension on said first brake operating cable, and continuing said alternate tensioning of said first and second brake operating cables to alternately brake one drive wheel while the other drive wheel is released to provide traction.

4. The means for alternately braking a pair of drive wheels on a automotive vehicle as defined in claim 3, wherein:

(a) said drive motor means comprises an electric drive means.

5. The means for alternately braking a pair of drive wheels on an automotive vehicle as defined in claim 3, wherein said drive means includes:
 (a) an elongated drive member interconnecting said drive motor means and said cable tension equalizer means for oscillating said cable tension equalizer means in one direction and then in another, to alternately exert and release said tensions on said first and second brake cables.

6. The means for alternately braking a pair of drive wheels on an automotive vehicle as defined in claim 3, wherein said drive means includes:
 (a) a swivel bar operatively connected with said first and second brake operating cables; and,
 (b) an elongated drive member interconnecting said drive motor means and said swivel bar for oscillating said swivel bar in one direction and then in another to alternately exert and release said tensions on said first and second brake cables.

7. The means for alternately braking a pair of drive wheels on an automotive vehicle as defined in claim 3, wherein:
 (a) said control means includes indicator light means to monitor the operation of drive motor means.

UNITED STATES PATENT OFFICE
CERTIFICATE OF CORRECTION

Patent No. 4,205,735    Dated    June 3, 1980

Inventor(s) CHARLES F. MURRAY

It is certified that error appears in the above-identified patent and that said Letters Patent are hereby corrected as shown below:

Column 6, line 3, delete "hereinafter" and insert --hereinbefore--.

Column 7, line 46, following "first", insert --brake--.

Column 8, line 52, delete "drive" and insert --driver--.

Signed and Sealed this

Sixteenth Day of September 1980

[SEAL]

Attest:

SIDNEY A. DIAMOND

Attesting Officer

Commissioner of Patents and Trademarks